US012791757B2

(12) United States Patent
Dyer et al.

(10) Patent No.: US 12,791,757 B2
(45) Date of Patent: Nov. 10, 2026

(54) GLOBAL MONITORING, PREDICTION AND DISPLAY OF AIRCRAFT CONTRAIL EXISTENCE AND PERSISTENCE

(71) Applicant: EarthCast Technologies, LP, Marshall, NC (US)

(72) Inventors: Jamie Lee Dyer, Starkville, MS (US); Jeffrey Matthew Vukovich, Wake Forest, NC (US); Chad Anthony Mello, Hillsboro, NM (US); Ryan Spencer Wilson, Atlanta, GA (US); Robert John Grey, Jr., Yorktown, VA (US); Gregory Sims Wilson, Marshall, NC (US); Pamela Jean McCown, Marshall, NC (US)

(73) Assignee: Earthcast Technologies, LP, Marshall, NC (US)

( * ) Notice: Subject to any disclaimer, the term of this patent is extended or adjusted under 35 U.S.C. 154(b) by 43 days.

(21) Appl. No.: 18/953,692

(22) Filed: Nov. 20, 2024

(65) Prior Publication Data

US 2026/0098984 A1 Apr. 9, 2026

Related U.S. Application Data

(60) Provisional application No. 63/612,576, filed on Dec. 20, 2023.

(51) Int. Cl.
*G01W 1/10* (2006.01)
*B64F 5/60* (2017.01)

(52) U.S. Cl.
CPC ................. *G01W 1/10* (2013.01); *B64F 5/60* (2017.01)

(58) Field of Classification Search
CPC ........... G01W 1/10; G01W 1/00; G01W 1/02; G01W 1/16; G01W 2001/003; G01W 2203/00; G01W 2201/00; G08G 5/22; G08G 5/23; G08G 5/53; G08G 5/56; G08G 5/727; G08G 5/76; G08G 5/34; G08G 5/26; G08G 5/32; G08G 5/30; G08G 5/50;
(Continued)

(56) References Cited

U.S. PATENT DOCUMENTS

| | | | | |
|---|---|---|---|---|
| 9,947,229 | B2 * | 4/2018 | Lynar | G05D 1/0808 |
| 11,183,074 | B2 * | 11/2021 | McCann | G08G 5/55 |

(Continued)

FOREIGN PATENT DOCUMENTS

| | | | | | |
|---|---|---|---|---|---|
| CA | 3059926 | A1 * | 11/2020 | | G08G 5/80 |
| EP | 3084482 | B1 * | 8/2019 | | G01W 1/10 |

(Continued)

OTHER PUBLICATIONS

Stuefer et al.; UPOS Product Atmospheric Contrail Layer Calculator: Geophysical Institute, University of Alaska Fairbanks, pp. 1-15; Mar. 8, 2006 (Year: 2006).*

(Continued)

*Primary Examiner* — Tung S Lau
(74) *Attorney, Agent, or Firm* — Kirk A. Wilson; Joseph T. Guy; Patent Filing Specialist I

(57) ABSTRACT

Systems and methods for globally predicting, monitoring and displaying aircraft contrail existence and persistence probabilities using high resolution numerical weather prediction models, aircraft engine type, critical temperatures, and regression analysis.

18 Claims, 11 Drawing Sheets

(58) Field of Classification Search
CPC .......... G08G 5/25; G01C 21/20; G01C 21/34; G01C 23/00; G01C 23/005; G01C 5/06; G05D 1/02; G05D 1/042; G05D 1/645; G05D 1/0202; G05D 2109/20; G05D 2109/22; G05D 2101/15; Y02T 90/00; B64F 5/60
USPC ............... 73/29.01, 73, 170.16, 384, 170.07, 73/170.11; 244/180; 340/963, 968, 945; 701/120, 14, 122, 10, 415; 702/3, 182, 702/183, 179, 127, 130, 175, 99, 98, 28
See application file for complete search history.

(56) References Cited

U.S. PATENT DOCUMENTS

| | | | | |
|---|---|---|---|---|
| 11,720,125 | B2 * | 8/2023 | Freiheit | B64C 29/00 701/10 |
| 2011/0025868 | A1 * | 2/2011 | Tillotson | G01W 1/02 348/222.1 |
| 2015/0019185 | A1 * | 1/2015 | Cunningham | G06F 30/20 703/6 |
| 2015/0284102 | A1 * | 10/2015 | Swann | F02C 9/16 701/3 |
| 2017/0084072 | A1 * | 3/2017 | Weitzberg | G06T 13/20 |
| 2023/0116146 | A1 | 4/2023 | Madden et al. | |
| 2023/0273626 | A1 * | 8/2023 | Durant | G08G 5/34 701/3 |
| 2023/0326354 | A1 * | 10/2023 | Durant | B64D 45/00 701/3 |

FOREIGN PATENT DOCUMENTS

| | | | | |
|---|---|---|---|---|
| EP | 3961012 | A1 | 3/2022 | |
| GB | 2524772 | A * | 10/2015 | F02C 9/00 |
| GB | 2524774 | A * | 10/2015 | B64C 15/12 |
| JP | 2010182287 | A * | 8/2010 | |
| RU | 2467360 | C1 | 11/2012 | |
| WO | WO 2022/079599 | A1 | 4/2022 | |
| WO | WO 2023/199240 | A1 | 10/2023 | |

OTHER PUBLICATIONS

Stuefer et al.; UPOS Product Atmospheric Contrail Layer Calculator: Geophysical Institute, University of Alaska Fairbanks, pp. 1-15; Mar. 8, 2006.

ISA/US; International Search Report and Written Opinion prepared for PCT/US2024/056666; Date mailed: Jan. 17, 2025.

Judith Rosenow et al.; Time of the day-dependent impact of Contrail Avoidance Strategies on Airline Delay Costs; ResearchGate; Jun. 2023.

Ascent Aviation Sustainability Center; Project 078 Contrail Avoidance Decision Support and Evaluation; Jun. 27-30, 2022.

Esther Roosenbrand et al; Assessing and Modeling Climate Optimal Flights Using Open Surveillance and Remote Sensing Data; ResearchGate; May 2022.

Ulrich Schumann; Influence of propulsion efficiency on contrail formation; Aerosp. Sci. Technol. 4 (2000) 391-401.

* cited by examiner

CF = 0.0300 g/kg/K (nonbypass)

| | RH (percent) | | | | | | | | | | |
|---|---|---|---|---|---|---|---|---|---|---|---|
| Pressure (hPa) | 0 | 10 | 20 | 30 | 40 | 50 | 60 | 70 | 80 | 90 | 100 |
| 50 | -68.12 | -67.83 | -67.52 | -67.17 | -66.78 | -66.34 | -65.84 | -65.23 | -64.47 | -63.38 | -60.20 |
| 100 | -62.46 | -62.15 | -61.81 | -61.44 | -61.03 | -60.57 | -60.03 | -59.38 | -58.57 | -57.41 | -54.02 |
| 150 | -58.97 | -58.65 | -58.30 | -57.92 | -57.49 | -57.01 | -56.45 | -55.78 | -54.94 | -53.74 | -50.21 |
| 200 | -56.42 | -56.09 | -55.73 | -55.33 | -54.90 | -54.40 | -53.83 | -53.14 | -52.27 | -51.04 | -47.41 |
| 250 | -54.38 | -54.05 | -53.68 | -53.28 | -52.83 | -52.33 | -51.74 | -51.04 | -50.15 | -48.89 | -45.18 |
| 300 | -52.69 | -52.35 | -51.98 | -51.57 | -51.11 | -50.60 | -50.00 | -49.29 | -48.38 | -47.10 | -43.32 |
| 350 | -51.24 | -50.89 | -50.51 | -50.10 | -49.63 | -49.11 | -48.50 | -47.78 | -46.86 | -45.56 | -41.72 |
| 400 | -49.96 | -49.61 | -49.22 | -48.80 | -48.33 | -47.80 | -47.19 | -46.45 | -45.52 | -44.20 | -40.32 |
| 450 | -48.82 | -48.46 | -48.07 | -47.65 | -47.17 | -46.63 | -46.01 | -45.27 | -44.33 | -42.99 | -39.06 |
| 500 | -47.78 | -47.42 | -47.03 | -46.60 | -46.12 | -45.58 | -44.95 | -44.20 | -43.25 | -41.90 | -37.92 |

FIG. 3

CF = 0.0340 g/kg/K (low bypass)

| | RH (percent) | | | | | | | | | | |
|---|---|---|---|---|---|---|---|---|---|---|---|
| Pressure (hPa) | 0 | 10 | 20 | 30 | 40 | 50 | 60 | 70 | 80 | 90 | 100 |
| 50 | -67.13 | -66.83 | -66.51 | -66.16 | -65.77 | -65.33 | -64.82 | -64.20 | -63.43 | -62.33 | -59.11 |
| 100 | -61.39 | -61.08 | -60.74 | -60.37 | -59.95 | -59.48 | -58.94 | -58.29 | -57.46 | -56.29 | -52.86 |
| 150 | -57.87 | -57.54 | -57.19 | -56.80 | -56.37 | -55.88 | -55.32 | -54.64 | -53.79 | -52.57 | -49.00 |
| 200 | -55.28 | -54.95 | -54.59 | -54.19 | -53.74 | -53.24 | -52.66 | -51.97 | -51.09 | -49.84 | -46.17 |
| 250 | -53.23 | -52.89 | -52.51 | -52.11 | -51.65 | -51.14 | -50.55 | -49.84 | -48.94 | -47.66 | -43.91 |
| 300 | -51.51 | -51.17 | -50.79 | -50.37 | -49.91 | -49.39 | -48.79 | -48.06 | -47.15 | -45.85 | -42.03 |
| 350 | -50.04 | -49.69 | -49.30 | -48.88 | -48.41 | -47.88 | -47.27 | -46.54 | -45.61 | -44.29 | -40.41 |
| 400 | -48.74 | -48.39 | -48.00 | -47.57 | -47.10 | -46.56 | -45.94 | -45.20 | -44.26 | -42.92 | -38.98 |
| 450 | -47.59 | -47.23 | -46.83 | -46.40 | -45.92 | -45.38 | -44.75 | -44.00 | -43.04 | -41.69 | -37.70 |
| 500 | -46.54 | -46.18 | -45.78 | -45.34 | -44.86 | -44.31 | -43.67 | -42.91 | -41.95 | -40.58 | -36.55 |

FIG. 4

CF = 0.0390 g/kg/K (high bypass)

| | RH (percent) | | | | | | | | | | |
|---|---|---|---|---|---|---|---|---|---|---|---|
| Pressure (hPa) | 0 | 10 | 20 | 30 | 40 | 50 | 60 | 70 | 80 | 90 | 100 |
| 50 | -66.02 | -65.72 | -65.40 | -65.04 | -64.65 | -64.20 | -63.68 | -63.06 | -62.28 | -61.17 | -57.91 |
| 100 | -60.22 | -59.90 | -59.56 | -59.18 | -58.76 | -58.28 | -57.73 | -57.07 | -56.24 | -55.05 | -51.57 |
| 150 | -56.64 | -56.31 | -55.96 | -55.56 | -55.13 | -54.63 | -54.06 | -53.38 | -52.51 | -51.28 | -47.66 |
| 200 | -54.02 | -53.69 | -53.32 | -52.91 | -52.46 | -51.96 | -51.37 | -50.66 | -49.77 | -48.51 | -44.79 |
| 250 | -51.94 | -51.59 | -51.22 | -50.81 | -50.35 | -49.83 | -49.23 | -48.51 | -47.60 | -46.30 | -42.50 |
| 300 | -50.20 | -49.85 | -49.47 | -49.05 | -48.58 | -48.05 | -47.44 | -46.71 | -45.78 | -44.46 | -40.58 |
| 350 | -48.71 | -48.35 | -47.96 | -47.54 | -47.06 | -46.52 | -45.90 | -45.16 | -44.22 | -42.88 | -38.94 |
| 400 | -47.39 | -47.03 | -46.64 | -46.21 | -45.73 | -45.18 | -44.55 | -43.80 | -42.84 | -41.49 | -37.49 |
| 450 | -46.22 | -45.86 | -45.46 | -45.02 | -44.53 | -43.98 | -43.34 | -42.58 | -41.62 | -40.24 | -36.20 |
| 500 | -45.16 | -44.79 | -44.39 | -43.95 | -43.45 | -42.90 | -42.25 | -41.48 | -40.50 | -39.11 | -35.03 |

FIG. 5

| | Relative Humidity (%) | | | | | | | | | | |
|---|---|---|---|---|---|---|---|---|---|---|---|
| | 0 | 10 | 20 | 30 | 40 | 50 | 60 | 70 | 80 | 90 | 100 |
| c0 | 9.9841E+03 | 9.7601E+03 | 9.5217E+03 | 9.2662E+03 | 8.9896E+03 | 8.6863E+03 | 8.3478E+03 | 7.9593E+03 | 7.4927E+03 | 6.8744E+03 | 5.3289E+03 |
| c1 | 4.2361E+02 | 4.1559E+02 | 4.0702E+02 | 3.9779E+02 | 3.8776E+02 | 3.7671E+02 | 3.6431E+02 | 3.4997E+02 | 3.3261E+02 | 3.0934E+02 | 2.4962E+02 |
| c2 | 6.1183E+00 | 6.0259E+00 | 5.9269E+00 | 5.8199E+00 | 5.7030E+00 | 5.5737E+00 | 5.4276E+00 | 5.2577E+00 | 5.0503E+00 | 4.7690E+00 | 4.0280E+00 |
| c3 | 2.9978E-02 | 2.9650E-02 | 2.9296E-02 | 2.8913E-02 | 2.8493E-02 | 2.8026E-02 | 2.7496E-02 | 2.6876E-02 | 2.6114E-02 | 2.5071E-02 | 2.2263E-02 |

y = pressure (hPa); x = temperature (C)

FIG. 9

| | Coefficient | | | |
|---|---|---|---|---|
| | c0 | c1 | c2 | c3 |
| c0 | 1.0070E+04 | 4.2700E+02 | 6.1611E+00 | 3.0143E-02 |
| c1 | -4.3753E+01 | -1.6428E+00 | -1.9849E-02 | -7.3663E-05 |
| c2 | 7.3300E-01 | 2.8892E-02 | 3.6534E-04 | 1.4059E-06 |
| c3 | -7.5102E-03 | -2.9470E-04 | -3.7091E-06 | -1.4217E-08 |

y = coefficient; x = relative humidity (%)

FIG. 10

GLOBAL MONITORING, PREDICTION AND DISPLAY OF AIRCRAFT CONTRAIL EXISTENCE AND PERSISTENCE

CROSS-REFERENCE TO RELATED APPLICATIONS

The present invention claims priority to U.S. Provisional Patent Application No. 63/612,576, filed Dec. 20, 2023, incorporated herein by reference in its entirety.

FIELD OF THE DISCLOSURE

This disclosure generally relates to systems and methods for globally monitoring, predicting and displaying aircraft contrail existence (formation) and persistence.

BACKGROUND OF THE INVENTION

A contrail is basically a man-made cirrus cloud, comprised of frozen water crystals, that form due to the addition of water vapor from aircraft exhaust that then condenses and freezes. Contrails form under specific atmospheric conditions that generally exist at high altitudes, specifically at low temperatures and pressure with adequate moisture content to reach saturation with the added water vapor from combustion within aircraft engines. Depending on the moisture and temperature conditions present during contrail formation, the contrail can only last a few seconds (short-lived) or can last for several hours (persistent).

Contrails have been a point of discussion since aircraft were first able to fly at altitudes where temperatures allowed their formation (~1919), and although initially considered a benign feature in terms of weather and climate impacts, contrails are recognized as potentially playing a role in the radiative feedback of the earth/atmosphere system. Additionally, for military and airborne surveillance operations, contrails are a challenge as they highlight existing aircraft.

A contrail is basically a cirrus cloud that forms under specific temperature, pressure, and moisture values due to the addition of water vapor from aircraft exhaust, Contrails require low temperatures, which means contrails in the mid-latitudes generally form at higher flight altitudes (~35,000-45,000'). This level decreases at higher latitudes and also varies seasonally; therefore, contrails are inherently more recognized over European airspace than over lower-latitude airspace over North/South America, Africa, and Asia.

Although initially considered a benign feature in terms of weather and climate impacts, contrails are recognized as potentially playing a role in the radiative feedback of the earth/atmosphere system through increased albedo and warming through greenhouse processes. For military and surveillance operations, contrails are a challenge as they highlight existing aircraft. Even the best stealth technology cannot overcome a giant white line pointing to the aircraft.

Contrails (short for condensation trails; a.k.a., vapor trails, condsleds, traces, cirrus tractus, etc.) are formed as water vapor in the exhaust of a jet engine mixes with ambient environmental air, which under the proper temperature and moisture conditions, condenses and freezes to form a cirriform cloud. These formations usually last only seconds or minutes, but under the right conditions they can persist for hours and even grow and/or propagate with the prevailing winds. These cloud formations, sometimes referred to scientifically as cirrus aviaticus, can influence the Earth's radiative balance and are therefore of interest to commercial aviation due to their potential influence on climate change. From a more direct perspective, the military aviation community is interested in the existence of contrails with any duration due to the fact that they highlight the location of the aircraft.

The Appleman curves have traditionally been used to define the existence of contrails based on temperature and relative humidity at a given pressure level. While the curves are a well-established and commonly utilized tool, they are generally used for point-scale assessment due to the need for upper-level meteorological information provided by radiosondes. Also, given the empirical nature of the curves, contrail prediction is often done using a 2D chart, limiting their application using gridded numerical weather prediction (NWP) data. From a physical perspective, the formation of contrails is based on known thermodynamic principles related to the conditions of the exhaust air relative to the saturation vapor pressure over water and ice. These conditions are difficult to precisely calculate due to the complex nature of the mixing process between the exhaust and the ambient atmosphere, along with the varying amount of water vapor within the exhaust due to the specific conditions of the jet engine (e.g., high vs. low vs. no bypass).

To account for these factors so that gridded NWP fields of pressure, temperature, and relative humidity can be used to develop a subsequent gridded field of potential contrail existence and persistence, the systems, methods and associated workflow described herein disclose a contrail prediction system suitable for operational use with high spatial resolution numerical weather prediction (NWP) model data.

BRIEF SUMMARY OF THE INVENTION

Aspects and advantages of the invention will be set forth in part in the following description, or may be obvious from the description, or may be learned through practice of the disclosure.

One or more embodiments of the present invention provides a method for predicting aircraft contrail existence and persistence, comprising the steps of: selecting an aircraft engine type and corresponding contrail factor (CF) in a contrail computer system (CCS); estimating values of critical temperature (Tc) based on the selected aircraft engine type using the contrail computer system; developing equations representing the critical temperature (Tc) of the selected aircraft engine type for any atmospheric pressure and relative humidity using the contrail computer system; calculating contrail existence and persistence probabilities of the selected aircraft engine type using the developed equations on the contrail computer system; and displaying contrail existence and persistence probabilities at selectable elevations in gridded fields of a high-resolution numerical weather prediction model on an output device of the contrail computer system.

Another embodiment of the invention is a contrail computer system for global monitoring, prediction, and display of aircraft contrail existence and persistence, having at least one computer processor operating in a super computing environment; at least one computer memory storing instructions which, when executed by the at least one computer processor, cause the computer processor to: select an aircraft engine type and corresponding contrail factor (CF); estimate values of critical temperature (Tc) based on the selected aircraft engine type; develop equations representing the critical temperature (Tc) of the selected aircraft engine type for any atmospheric pressure and relative humidity; calculate contrail existence and persistence probabilities of the selected aircraft engine type using the developed equations; and display contrail existence and persistence probabilities at selectable elevations in gridded fields of a high-resolution numerical weather prediction model on an output device.

Another embodiment of the invention provides a computer-implemented method for predicting aircraft contrail existence and persistence, the method executed by one or more processors of a contrail computer system (CCS) coupled to a numerical weather prediction (NWP) data source, comprising: receiving, from the NWP data source, multi-dimensional gridded atmospheric data comprising temperature, pressure, and relative humidity values across a plurality of altitude levels and geographic coordinates; selecting an aircraft engine type and retrieving a corresponding contrail factor (CF) from a stored engine-specific database; computing, via the one or more processors, a critical temperature (Tc) field over the multi-dimensional grid by applying a plurality of engine-dependent thermodynamic equations parameterized as continuous functions of pressure and relative humidity, wherein the thermodynamic equations include at least one non-linear relationship defining contrail formation thresholds as a function of both pressure and relative humidity across multiple altitude-dependent regimes; generating, for each grid point and altitude level, a contrail formation probability and a contrail persistence probability based on comparison of the Tc field with the received atmospheric data, wherein the probabilities define a three-dimensional gridded probability field; updating the three-dimensional gridded probability field in response to time-varying NWP data to produce a time-evolving contrail prediction model; and outputting, to a flight planning interface, the three-dimensional gridded probability field configured for modifying an aircraft flight path to reduce contrail formation.

Yet another embodiment of the invention provides a contrail prediction system comprising: one or more processors; a memory storing instructions; and an interface to a numerical weather prediction (NWP) data source, wherein the instructions, when executed, cause the system to: ingest multi-dimensional gridded atmospheric datasets including temperature, pressure, and relative humidity; retrieve engine-specific contrail factor (CF) values from a structured database; compute a grid-resolved critical temperature (Tc) field using engine-dependent thermodynamic equations varying continuously with atmospheric pressure and relative humidity; wherein the thermodynamic equations include at least one non-linear relationship defining contrail formation thresholds as a function of both pressure and relative humidity across multiple altitude-dependent regimes; generate a three-dimensional contrail probability field across selectable altitude layers and dynamically update the probability field based on real-time or forecast weather data; and output the probability field to a flight path optimization module configured to display alternate aircraft flight paths.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIGS. 3-5 illustrate values representing $T_c$ for various atmospheric pressure and relative humidity values representative of a given contrail factor;

FIG. 9 illustrates polynomial coefficients describing Appleman curves for a contrail factor of low bypass engine for relative humidity from 0-100% at 10% increments;

FIG. 10 illustrates polynomial coefficients describing curves relating relative humidity to coefficient values for Appleman curves associated with a contrail factor of 0.0340 $g\ kg^{-1}\ K^{-1}$;

Figure 1:
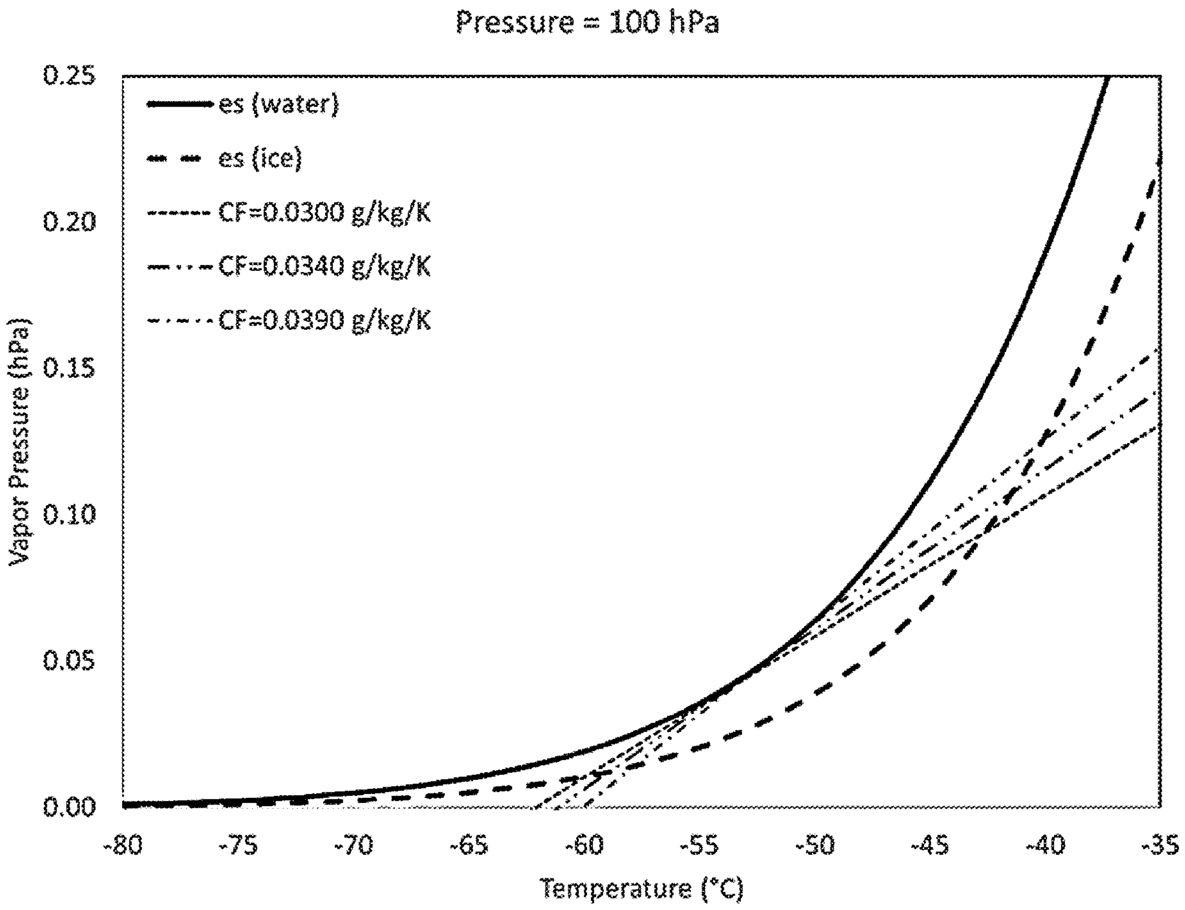
FIG. 1 illustrates the wake parcel lines for contrail factors of non-bypass engine, low bypass engine, and high bypass engine for an ambient atmospheric pressure of 100 hPa.

Repeat use of reference characters in the present specification and drawings is intended to represent the same or analogous features or elements of the present disclosure.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

High-resolution numerical weather prediction (NWP) is a method for producing detailed forecasts of meteorological events over small geographic and temporal intervals. High-resolution NWP models use denser computational grids and more frequent calculations along those grids, as well as more sophisticated physical parameterizations related to processes such as convection, cloud physics, and radiative transfer, to produce more realistic descriptions of atmospheric phenomena such as contrails. Additionally, high-resolution NWP models often rely on high-density observations, such as satellite and radar information, for assimilation of observed conditions at the predictive scales within the models. Typical high-resolution NWP models produce forecasts of meteorological events at a horizontal spatial scale of 1-5 km, a vertical spatial scale of 50-500 m, and a temporal scale of minutes to hours. The horizontal grid for high-resolution NWP models is generally the primary consideration in their definition; however, given the range in values associated with these prediction systems, the term "high spatial resolution" or "high resolution" is defined herein as a computational grid of less than or equal to 3-km×3-km, which is generally considered the requirement for models to directly predict convective processes instead of relying on cumulus parameterization schemes. Technologically advanced models of this type are commonly referred to as convection allowing models (CAM) within the scientific community and are needed to reliably represent the environmental conditions and processes associated with contrail formation.

Contrails form as water vapor from aircraft exhaust forces saturation of the atmospheric air, which then condenses and freezes into frozen particulates. Depending on the moisture conditions present during contrail formation, the contrail can only last a few seconds (short-lived) or can last for several hours (persistent). Persistent contrails are generally associated with higher humidity values, although other factors such as vertical air velocity can also play a substantial role. Persistent contrails can spread out over several miles depending on the stability of the surrounding atmosphere and can move tens or even hundreds of kilometers horizontally based on prevailing winds.

The specific temperature and moisture values required for contrail formation depend on the atmospheric pressure at which the aircraft is flying; therefore, the probability of contrail formation is restricted to criteria values at specific flight levels. The saturation of air required to form contrails is balanced by the addition of water vapor and heat from the engine exhaust. As this air mixes with the ambient air, the resulting equilibrium state of the mixed system relative to the initial ambient air defines the probability of a contrail.

Predicting contrail formation has traditionally been accomplished using the Schmidt-Appleman criterion, which relates temperature and humidity at specific pressure levels to contrail formation probability. Following this approach, contrail formation can be predicted using only estimates of atmospheric pressure, temperature, and relative humidity given a specified engine type (or engine performance parameters). A contrail is predicted to form when the combination of aircraft engine exhaust and the surrounding air reaches saturation with respect to liquid water, which occurs at a criteria temperature called the critical temperature ($T_c$). If the vapor pressure calculated using $T_c$ is greater than or equal to the saturation vapor pressure over ice, a persistent contrail will form as the frozen particles persist due to the lack of sublimation.

Predicting the persistence of contrails requires knowledge of the relative humidity at a flight level relative to the ice saturation vapor pressure, with linear interpolation traditionally used to transform from relative humidity to vapor pressure with respect to temperature. The Clausius-Clapeyron equation shows that this association is logarithmic and not linear, which adds a level of error to the results.

Logistic regression is the preferred method of predicting contrail formation, as the approach allows for the quantification of contrail formation as a probability. Such an approach requires previous knowledge of atmospheric variables associated with known contrails; therefore, the models will improve with subsequent observations and consistent measurement procedures.

Contrails are inherently small in terms of spatial coverage (on the order of 100 meters) and are therefore difficult to observe using satellite observations. Furthermore, accurate prediction of environmental conditions associated with contrail formation requires knowledge of temperature, pressure, humidity, and wind speeds at those scales. Existing radiosonde data are extremely limited; therefore, gridded numerical weather prediction (NWP) data are often used in place of measurements to provide a contrail prediction. An example NWP product that meets performance and quality criteria for enabling contrail prediction herein is the Global Environmental Weather Intelligence System (GEWIS) of Earthcast Technologies. Other NWP models might meet the criteria but would likely need additional development. Through this approach, the primary challenges for generating a viable contrail probability field are: (1) a suitable vertical and horizontal resolution to resolve the atmospheric parameters associated with contrail formation, and (2) a satisfactory prediction accuracy to provide viable data for calculating contrail formation probability.

Engine type can play a role in contrail formation, as bypass (turbofan) engines have lower exhaust temperatures as a portion of the energy (in the form of heat) is used to turn the fan. Non-bypass engines, therefore, have different contrail formation factors than bypass engines, as represented by different Appleman curves.

All aircraft have the potential to form contrails; however, the specific characteristics of a potential contrail (e.g., persistence) depend on other factors including engine efficiency, kinetic energy feedbacks and interactions among aircraft-induced vortices, type of fuel used (e.g., kerosene vs. hydrogen), local and synoptic-scale atmospheric turbulence/advection. As such, it is difficult to produce a system viable for all types of aircraft and engine types, and it is even more difficult to define specific criteria representative for all aircraft and flight conditions.

While fine-tuning of the Appleman criteria for defining $T_c$ is valid for improving the prediction of contrail formation probability, a more notable improvement in prediction accuracy is noted by solving the equations using more accurate atmospheric data. As such, efforts related to solving the Appleman criteria using more accurate atmospheric information is the preferred method for improving contrail probability forecasting using the technological advancements taught herein.

Moisture criteria associated with persistent contrail formation, including humidity, water vapor pressure, and saturation vapor pressure over ice, can often change over short space and time scales; therefore, a prediction strategy should incorporate high-resolution data fields to better represent the 3D structure of atmospheric characteristics to allow for a better 3D representation of contrail formation probability. This will allow pilots and aircraft operators to proactively (strategic) and reactively (tactical) adjust flight plans to minimize potential contrail formation.

Advantages of the system include using high spatial resolution models and improved atmospheric data accuracy at flight levels through assimilation of satellite data. These advantages are especially true for moisture variables, which are critical for defining contrail formation probability. Proven performance in turbulence forecasting is a possible future data field for further improvement of persistent contrail formation.

This written description discloses improved technology through specific technological means for predicting contrail existence (formation) and persistence which are reflected in the claims herein. Specific technological means taught herein include using high spatial resolution atmospheric models (NWP) for improved atmospheric data accuracy and using logistic regression for developing equations that more accurately predict contrail formation and persistence.

System Methodology

1. Estimate the Values of Critical Temperature ($T_c$) Based on Engine Type:

As jet engines produce high temperature, high humidity exhaust relative to the surrounding environment, the exhaust (a.k.a., wake parcel) will cool through an isobaric adiabatic process until reaching equilibrium with the ambient air. For the isobaric process, ambient air entrains into the wake parcel through mixing along the parcel boundary, while for the adiabatic process, expansion of the wake parcel due to the temperature (and associated pressure) gradient relative to the ambient air leads to a decrease in heat content and therefore temperature. Taken together, the rate of decrease in temperature of the wake parcel is proportional to the temperature and pressure gradient between the exhaust and ambient conditions, such that the decrease in a wake parcel's volumetric moisture content (absolute humidity) is, assuming the specific volume of water vapor is much larger than that of liquid water ($a_v \gg a_w$), directly proportional to the temperature decrease relative to ambient pressure. Based on these processes, conditions within the wake parcel approach those of the ambient atmosphere along a line (within pressure-temperature space) with a slope equal to the ratio of water vapor relative to the temperature of the parcel due to the moisture and heat added (respectively) by the jet engine. This slope, commonly defined as the contrail factor (CF) in units of water vapor mixing ratio per degree; g $kg^{-1}$ $K^{-1}$, varies based on engine type, fuel used, flight parameters, and other factors. As a result, this value is not constant; therefore, representative values must be used to estimate contrail formation. The choice of this value depends on the general type of aircraft in question and average flight parameters. Previous research estimates that the contrail factor can vary from 0.0295 g $kg^{-1}$ $K^{-1}$ (Pilié and Jiusto, 1958) to 0.049 g $kg^{-1}$ $K^{-1}$ (Peters, 1993), with a theoretical minimum of 0.028 g $kg^{-1}$ $K^{-1}$ (Busen and Shumann, 1995). An average value of 0.0336 g $kg^{-1}$ $K^{-1}$ was used by Appleman (1953) to define a representative value for low bypass jet engines, although generalized values representing other jet engine bypass ratings can also be used (Shrader, 1997), including: 0.0300 g $kg^{-1}$ $K^{-1}$ (non-bypass), 0.0340 (low bypass), 0.0390 g $kg^{-1}$ $K^{-1}$ (high bypass). Busen and Schumann (1995) explain that uncertainties in the specification of contrail factor play an important role in the accuracy of any contrail prediction.

Given a contrail factor, the critical temperature ($T_c$) is defined as the maximum temperature at which contrails will form for a given ambient relative humidity and pressure. As the liquid water quickly freezes due to the subfreezing temperatures at flight altitudes, causing contrails to form cirrus cloud structures, the treatment of contrail persistence is related to the wake parcel line in the context of saturation vapor pressure over ice, such that the contrail will dissipate due to sublimation as the wake parcel vapor pressure is below that of the saturation vapor pressure over ice. As described below, using estimates of known atmospheric parameters and physical thermodynamic principles, the value of $T_c$ and the associated contrail formation probability can be calculated using values of atmospheric temperature, pressure, and relative humidity.

The saturation vapor pressure curves over water and ice can be estimated using the traditional Clausius-Clapeyron equation:

Saturation vapor pressure over water ($e_{sw}$)

$$\frac{de_{sw}}{dT} = \frac{l_v}{T(a_v - a_w)} \tag{1}$$

Saturation vapor pressure over ice ($e_{si}$)

$$\frac{de_{si}}{dT} = \frac{l_s}{T(a_v - a_i)} \tag{2}$$

where Tis temperature, $a_v$, $a_w$, and $a_i$ are the specific volume of water vapor, liquid water, and ice, respectively, and $l_v$ and $l_s$ are the specific latent heat of vaporization and sublimation, respectively, which can be estimated by:

$$l_v = l_{v0} + (c_{pv} - c_{pw})(T - T_0) \tag{3}$$

$$l_s = l_{s0} + (c_{pv} - c_{pi})(T - T_0) \tag{4}$$

These equations describe $l_v$ and $l_s$ as functions of temperature, relative to a reference state (the triple point of water) where $T_0$=273 K (0° C.), $l_{v0}=2.5\times10^6$ J $kg^{-1}$, $l_{s0}=2.834\times10^6$ J $kg^{-1}$, $c_{pv}$=1850 J $kg^{-1}$ $K^{-1}$, $c_{pw}$=4218 J $kg^{-1}$ $K^{-1}$, and $c_{pi}$=2106 J $kg^{-1}$ $K^{-1}$, and $e_{s0}$=6.11 hPa.

Combining these equations while considering water vapor as an ideal gas, such that $e_{sw}a_v=R_vT$, Equations 1 and 2 can be written as $$\frac{1}{e_{sw}}\frac{de_{sw}}{dT} = \frac{l_{v0} + (c_{pw} - c_{pv})T_0}{R_vT^2} - \frac{c_{pw} - c_{pv}}{R_vT} \tag{5}$$

$$\frac{1}{e_{si}}\frac{de_{si}}{dT} = \frac{l_{s0} + (c_{pi} - c_{pv})T_0}{R_vT^2} - \frac{c_{pi} - c_{pv}}{R_vT} \tag{6}$$

Integrating these equations with respect to the triple point of water (see above for associated reference values), they can be reduced to the following approximations:

$$e_{sw} = 6.11\exp\left(53.49 - \frac{6808}{T} - 5.09\ln(T)\right) \tag{7}$$

$$e_{si} = 6.11\exp\left(26.16 - \frac{6293}{T} - 0.555\ln(T)\right) \tag{8}$$

To compare the wake parcel to the saturation vapor pressure over water and ice, the associated wake parcel line must be transformed into pressure-temperature space. This is done using the equation for mixing ratio (units of g $kg^{-1}$):

$$w_s = 622\frac{e_s}{p - e_s} \tag{9}$$

where $w_s$ is the saturation mixing ratio (g $kg^{-1}$) and $e_s$ is saturation vapor pressure (hPa or mb). Solving this equation for $e_s$ and differentiating with respect to temperature gives the equation describing the slope of the wake parcel line in units of vapor pressure per degree:

$$\frac{d}{dT}e_s(T) = \frac{p}{622}\frac{d}{dT}w_s(T) = CF\frac{p}{622} \tag{10}$$

Assuming saturated conditions (relative humidity of 100%), the critical temperature ($T_{c,100}$) at a given pressure is defined as the point at which the contrail formation line (defined by the contrail factor in pressure-temperature space) intersects the tangent point of the saturation vapor pressure over water curve (FIG. 1). This value of $T_{c,100}$ is used as the baseline for estimates of $T_c$ at other relative humidity levels ($T_{c,RH}$), which can be calculated using the generalized approximation of relative humidity as the ratio of vapor pressure to saturation vapor pressure at a given temperature and pressure.

Figure 2:
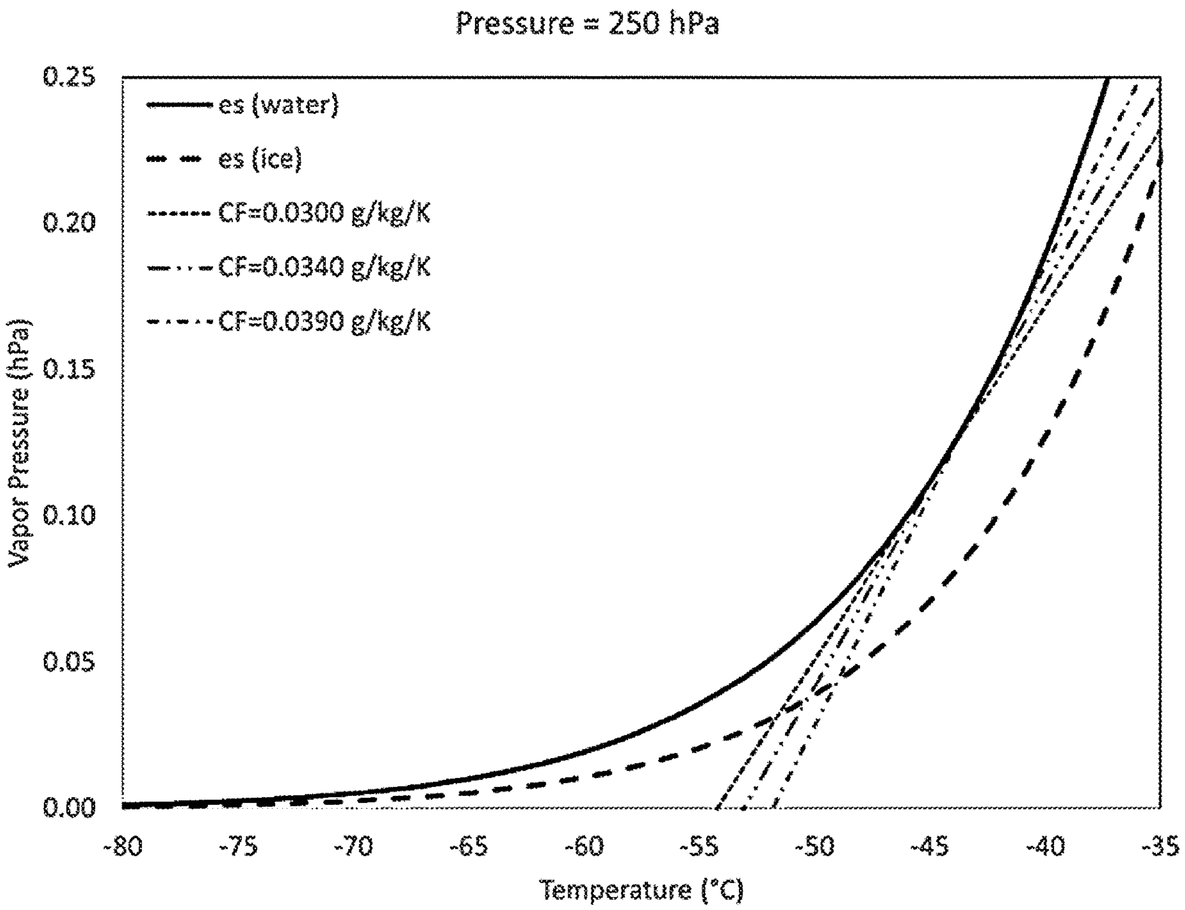
FIG. 2 illustrates the wake parcel lines for contrail factors of non-bypass engine, low bypass engine, and high bypass engine for an ambient atmospheric pressure of 250 hPa.

FIGS. 1 and 2 illustrate the wake parcel lines for contrail factors of 0.0300 g $kg^{-1}$ $K^{-1}$ (non-bypass engine), 0.0340 g $kg^{-1}$ $K^{-1}$ (low bypass engine), and 0.0390 g $kg^{-1}$ $K^{-1}$ (high bypass engine) for (FIG. 1) 100 hPa and (FIG. 2) 250 hPa atmospheric pressure levels. The point tangent to the saturation vapor pressure over water curve ($e_{sw}$) to a vapor pressure of 0 hPa represents the critical temperatures at 100% relative humidity ($T_{c,100}$) while the line segment extending to a vapor pressure of 0 hPa represents $T_c$ at any relative humidity.

Figure 6:
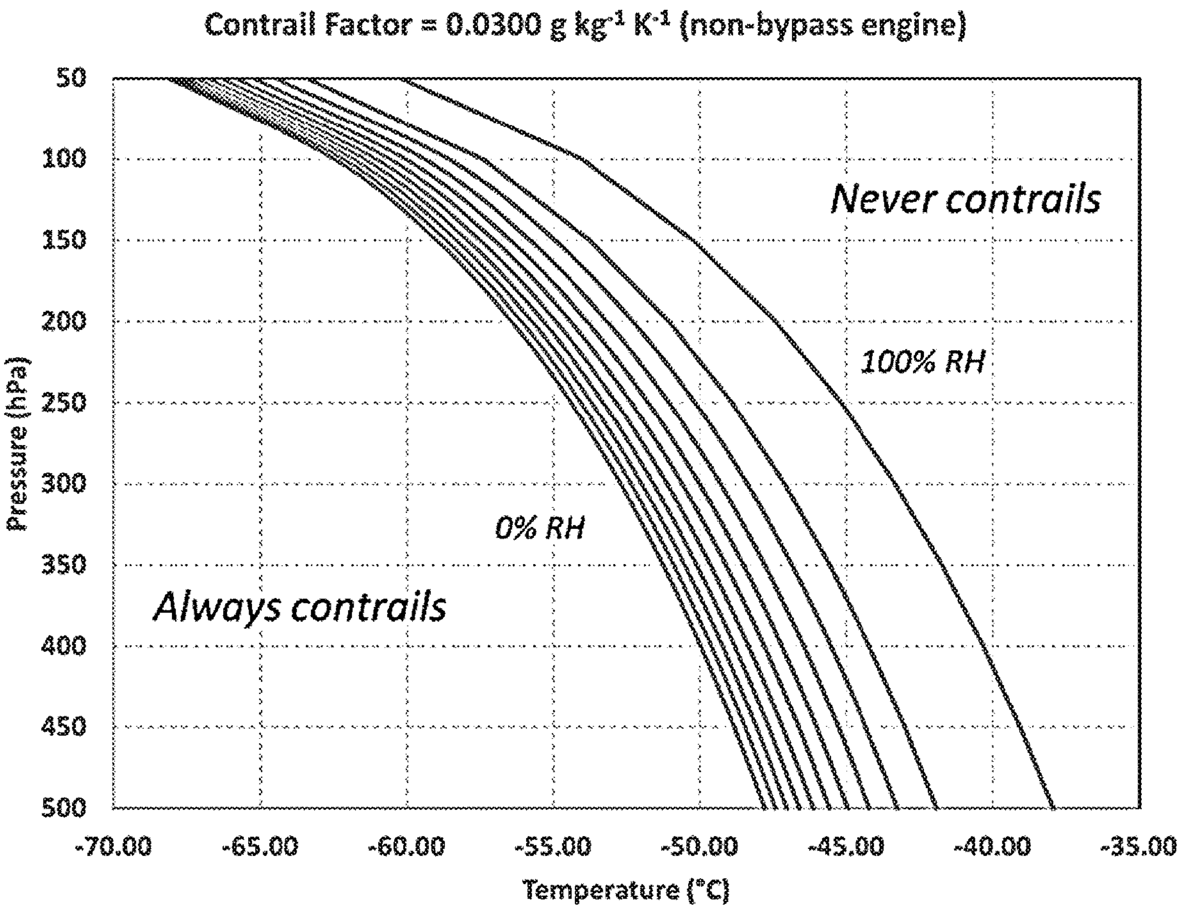
FIGS. 6-8 illustrate Appleman diagrams representing critical temperatures (Tc) at 10% relative humidity increments for example contrail factors.
Figure 7:
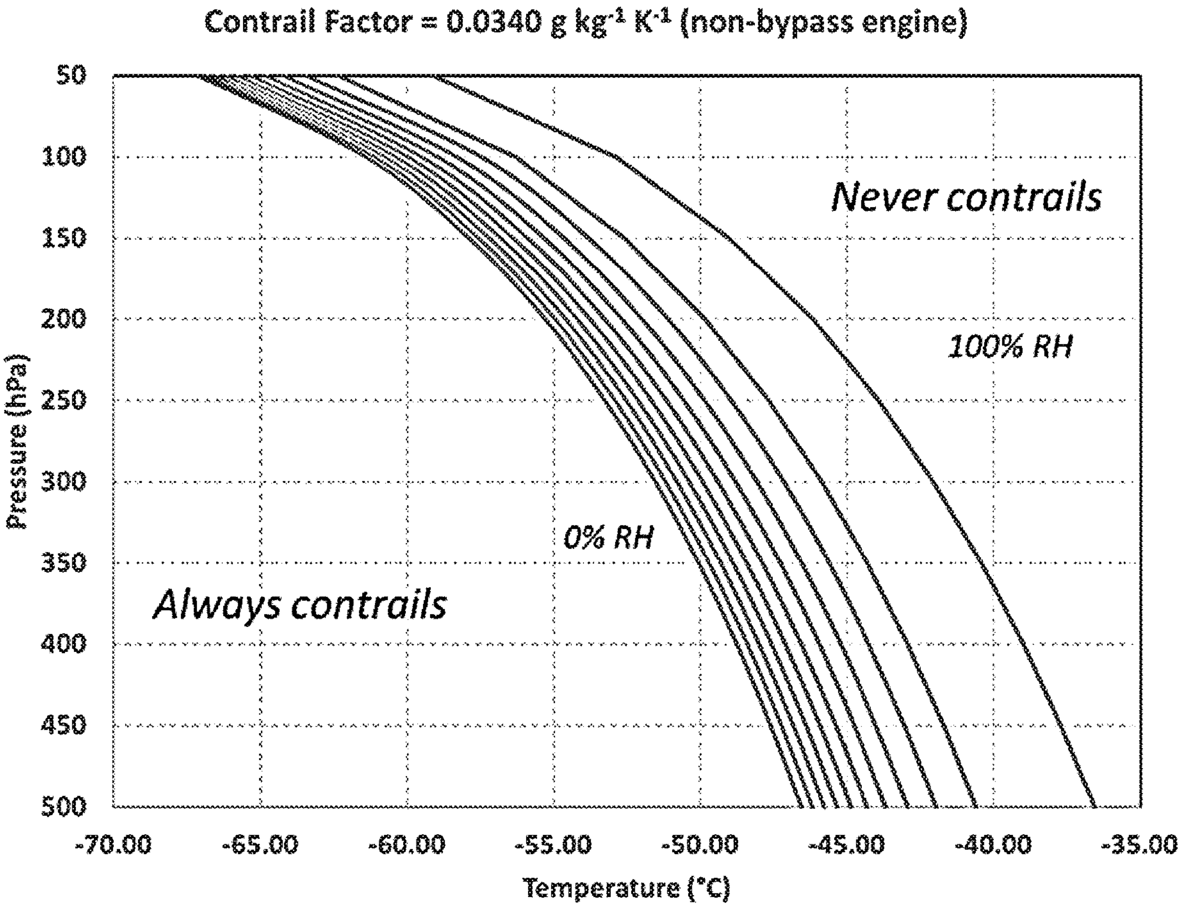
Figure 8:
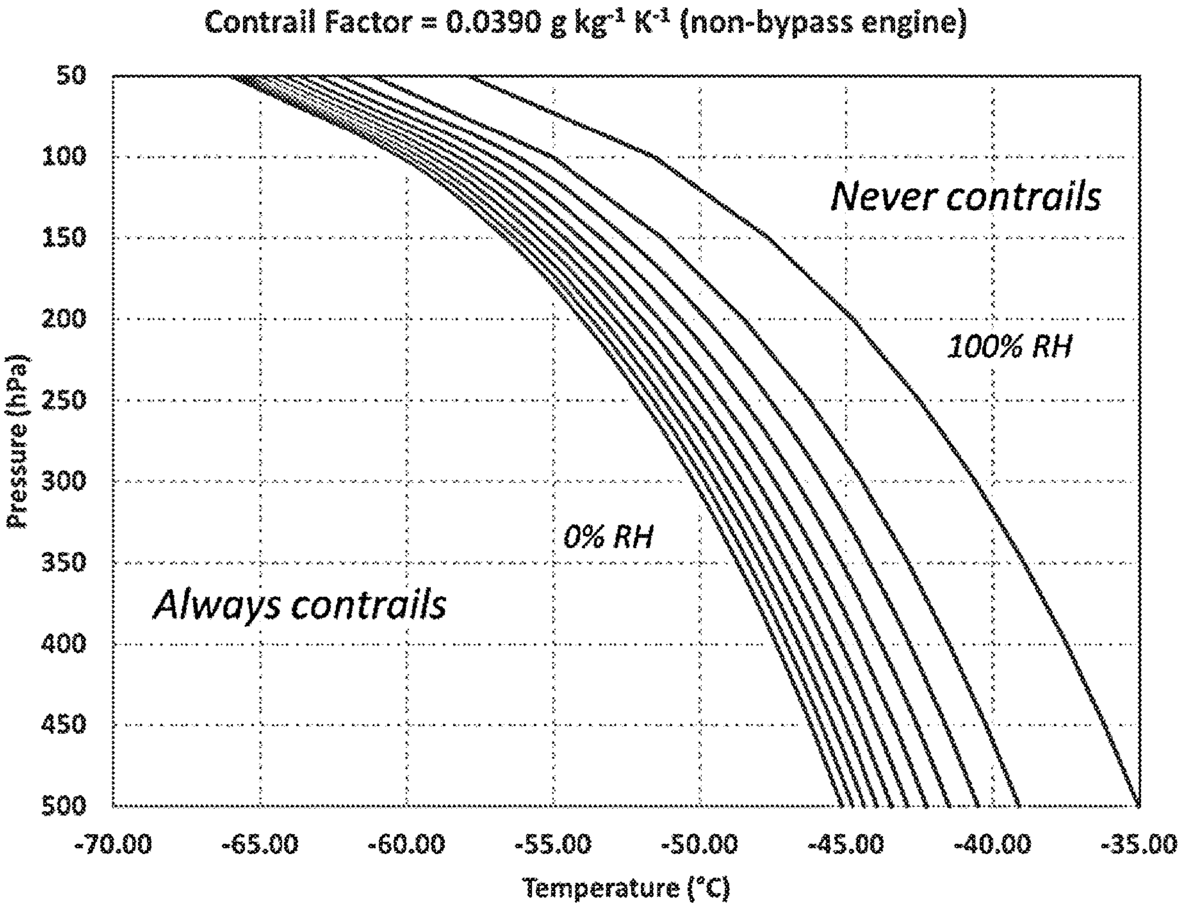

The first step in the calculation of the contrail prediction system is the calculation of $T_c$ at various pressure levels and relative humidity values. While these variables are continuous and can be solved at any point, they do require several computational steps that can become intensive when the number of points becomes large, such as with a NWP model with high horizontal and vertical grid spacing, i.e. high spatial resolution models. As a result, $T_{c,100}$ is initially calculated at pressure values between 500 hPa and 50 hPa at 50 hPa intervals, after which $T_c$ is estimated at relative humidity values from 0-100% at 10% intervals. The results from this step include values representing $T_c$ for various pressure and relative humidity values representative of a given contrail factor as shown in FIGS. 3-5, which can then be visualized as Appleman diagrams in FIGS. 6-8.

2. Develop Equations Representing $T_c$ for any Pressure and Relative Humidity:

While $T_c$ can be calculated physically at any pressure value, the approach can become computationally expensive, detracting from the operational suitability of a predictive system. As a result, logistic regression analysis is preformed and third-order polynomials are fit to the curves developed in Step 1 (see FIG. 2 for examples) to estimate $T_c$ at any pressure level, allowing for contrail formation to be predicted along continuous pressure values. This is needed as aviation customers will likely need system results at flight levels rather than pressure levels, requiring pressure to vary in the underlying calculations of contrail probability with the transformation from model-native isobaric surfaces to constant height surfaces.

The most important aspects of the Appleman curves are the 0% and 100% relative humidity curves, such that values of $T_c$ below those given at 0% relative humidity always produce contrails while values of $T_c$ above those given at 100% relative humidity never produce contrails. Given this information, values of $T_c$ between these criteria levels produce contrails based on the relative humidity of the air at a given pressure level; therefore, there are an infinite number of curves of $T_c$ related to relative humidity between 0-100% at any pressure level. To numerically account for this, third-order polynomials were fit to the available curves for relative humidity. The subsequent equation then takes the following form, with the associated coefficients provided in FIG. 9.

$$y = c_0 + c_1 x + c_2 x^2 + c_3 x^3 \quad (11)$$

where y is the pressure (hPa) and x is relative humidity (%). It should be noted that the $R^2$ values, from the logistic regression analysis, for all the curves were above 0.99 between the third-order polynomial curves and the initial Appleman curves at all relative humidity values (0-100%; 10% increments).

As this equation is only available for the relative humidity values used in Step 1 (0-100%; 10% increments), it's necessary to generate equations that can estimate the associated values of $T_c$ for any relative humidity value. This is necessary to account for the continuous variable within the output of a NWP model. Continuing with the above approach, third-order polynomials were fit to the values for each of the coefficients, leading to equations that provide values of the coefficients for any relative humidity values as shown in FIG. 10. Again, while these values could be estimated analytically using the physical equations described in Step 1, the estimation approach using the third-order polynomials increases computational efficiency with a minimal impact on the accuracy of the resulting estimates.

FIG. 9 shows the polynomial coefficients describing Appleman curves for a contrail factor of 0.0340 g $kg^{-1}$ $K^{-1}$ (low bypass engine) for relative humidity from 0-100% at 10% increments. FIG. 10 shows polynomial coefficients describing curves relating relative humidity to coefficient values for Appleman curves associated with a contrail factor of 0.0340 g $kg^{-1}$ $K^{-1}$ 3. Calculate Contrail Existence:

Using the equations produced from Step 2, values of temperature and relative humidity from the NWP model can be used to define a criteria pressure at any grid point to estimate the likelihood of contrail formation. As NWP models generally provide output in isobaric coordinates, this approach allows for a numerical comparison using native model grid values. This pressure can then be compared to the pressure associated with the critical temperature ($T_c$) at any point to define if a contrail is likely to form.

While the contrail system can provide a binary result (0=no contrail, 1=contrail), higher relative humidity values can be expected to have a higher probability of contrail formation at the same pressure. As a result, the value of relative humidity at a grid point is used to replace values of 1 within the contrail computer system (CCS) field to provide an estimate of contrail formation and persistence probability of between 0% and 100%.

Figure 12:
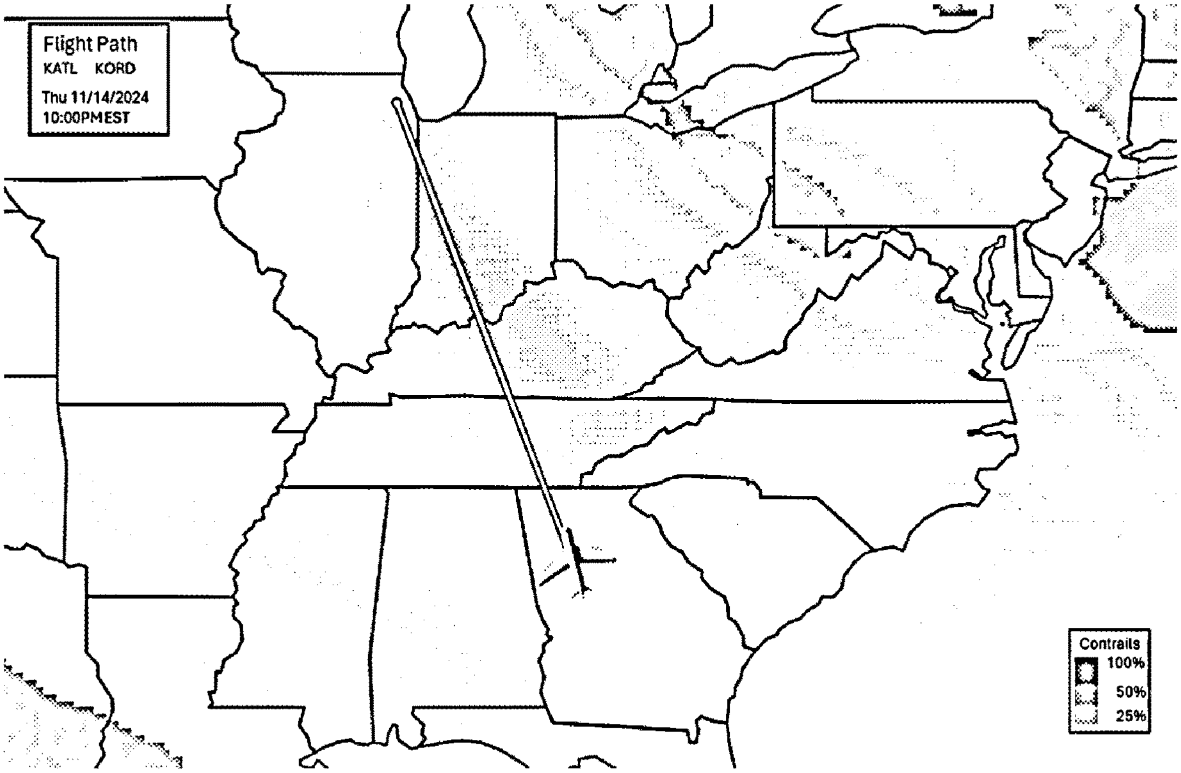
FIG. 12 illustrates a display of a contrail computer system output device flight path showing three contrail formation and persistence probabilities (100%, 50%, and 25%) along a specific altitude or elevation of the planned flight path.

Also, without determining contrail persistence directly, which can be done using the saturation vapor pressure curve over ice and the wake parcel line calculated from Step 1, the relative humidity can be used as a first approximation of contrail persistence probability as higher relative humidity values will lead to lower rates of sublimation. To define an aircraft's potential to generate contrails, then, flight parameters associated with altitude (flight level or pressure altitude), geographic location (latitude and longitude), and engine type (for estimating contrail factor) are needed to relate the aircraft's specific location to a contrail probability value. This can be done in-flight, or a flight's predicted path during the planning phase can be compared with contrail existence probability fields to adjust for contrail avoidance. For example, FIG. 12 illustrates a black & white display of a contrail computer system output device flight path travelling from KATL (Atlanta Hartsfield/Jackson) to KORD (Chicago O'Hare) and showing three contrail formation and persistence probabilities (100%, 50%, and 25%) along a specific altitude or elevation of the planned flight path. This display informs the pilot that the planned flight path and altitude has a 100% (dark gray area) and 50% (medium gray area) probability of forming a persistent contrail, thereby providing an opportunity for the pilot to redirect the flight path for contrail formation avoidance. This display, with the probabilities displayed in different screen colors, can be more easily read by a pilot.

Figure 11:
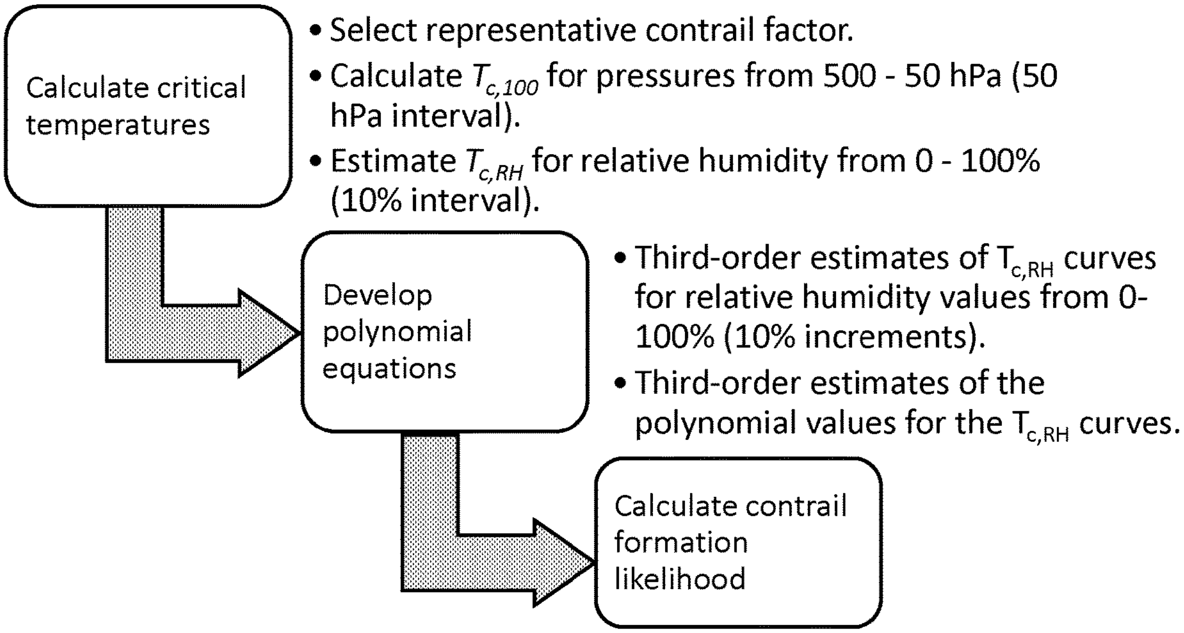
FIG. 11 illustrates a generalized flowchart describing the generation of the prediction of aircraft contrail existence and persistence system.

A generalized flowchart describing the generation of the prediction of aircraft contrail existence and persistence system is illustrated in FIG. 11.

A contrail computer system (CCS) suitable for use by the aircraft contrail prediction system described above can use full global satellite monitoring organized by satellite data types which are usually measured by similar instruments on many different satellites in different orbits owned by select public and private satellite operators like NASA, NOAA, DOD, USGS, UCAR, etc. in the U.S., EUMETSAT in Europe, and Jaxa in Japan, to provide constant monitoring and in-situ validation over the full globe. These data are constantly being ingested to provide a continuous operational package of initial conditions for numerous global, regional, mesoscale and local predictions systems covering many different areas and times around the globe; all sky microwave radiances (>50 instruments), clear sky microwave radiances (>40 instruments), infrared sounding radiances (>25 instruments), GPS radio occultation (GPSRO) (>7 satellite sensors), atmospheric motion vectors (>55 instruments), geostationary radiances (>15 instruments), surface wind (>14 instruments), soil moisture and ocean salinity (SMOS) (>6 instruments), NESDIS snow and ice mapping system (IMS) (Processing System), ozone monitoring (>19 instruments), soil moisture (>4 instruments), significant wave height orbits, and other highly inclined orbits (>8 instruments).

Another important component of the contrail computer system can be the surface-based product generation system. It integrates worldwide information from radar, surface and upper air observations, lightning detection systems, land imaging satellites, and numerical weather prediction (NWP) to produce a suite of products relevant to operations including precipitation type, intensity, and amount; icing; turbulence; and vertical precipitation profiles, etc.

Another component of the contrail computer system can be the quantification of weather information through the Nowcast NWP system. While it is possible to run a NWP model at very high spatial resolutions, this approach is sometimes undesirable due to enhanced noise contamination during model execution. Instead, the customized contrail computer system has the flexibility to run cloud resolving-scale predictions and downscaling to hyper-local resolutions using the NWP parameterization physics. This flexibility and downscaling approach allows the contrail computer system to produce atmospheric and surface information relevant to operations at a rapid update cycle. As a result, this would make it possible to operate the contrail computer system in current observing, short-term Nowcast, and planning forecast configurations capable of providing the full range of required local weather and environmental information, anywhere on the globe.

Underpinning the contrail computer system can be an operational super computing environment that provides fully-redundant cloud-based operational services tailored to meet mission-critical needs. The contrail computer system is configured with multiple channels of communications redundancy at a Tier III, highly secured supercomputing facility with automated failover and systems monitoring. This expandable hybrid cloud system can store large environmental analytic data archives to support both real-time and retrospective applications. The Petaflop computing on-demand capabilities allow for the integration of numerous observational platforms for the most advanced real time commercial NWP model execution and product delivery system in the world. Model efforts are calibrated through validation and verification to ensure the highest level of accuracy for specific needs. Through dedicated professional support and monitoring, contrail prediction can be delivered without interruption for mission-critical operations worldwide.

Components of the contrail computer system may include a variety of computing devices and systems, including laptop computer systems, desktop computer systems, server computer systems, distributed computer systems, smartphones (e.g., the Apple® iPhone™, the Motorola® Droid®, and the BlackBerry® Storm™), tablet computers (e.g., the Apple® iPad™, the HP® Slate, and the Samsung® Galaxy™ Tablet), microcontroller-based embedded systems, and/or the like.

Because of its highly flexible configuration, the contrail computer system (CCS) can be adapted into any processing framework and is capable of ingesting real-time data from newly deployed systems with minimal effort. For example, the Micro Weather Sensor (MWS; Physical Optics Corporation) can send a data stream to and be ingested by the customized CCS to be integrated into nowcast products to increase situational awareness. In addition, crucial information about the aircraft's boundary layer structure and its properties can be obtained by using meteorological packages to sample the boundary layer. Aircraft-based data can be analyzed to provide information about near-surface heat and energy fluxes, convective potential, and even icing and turbulence probability. Meteorological information provided by the aircraft can then be ingested by the customized CCS to (1) enhance the situational awareness of the weather conditions near and/or within the flight area, and (2) improve in-route NWP products by assimilating the data real time into the customized CCS.

The flexible framework of CCS also provides the capability to customize the user interface and products to meet many requirements. Additional information from CCS on environmental and weather intelligence can improve aircraft safety, enhance mission capability, build synergy for all phases of flight, improve situational awareness, and maximize sensor abilities for mission success. This will improve overall air safety, command and control, airspace management, and communications for the entire community.

The CCS system provides real time information about contrail prediction, turbulence and other hazards while inflight worldwide. CCS provides global environmental hazard information combined with live flight tracking to deliver real-time flight-specific alerts directly to pilots in the cockpit at the spatial and temporal scales required for decision making at high cruising speeds. Pilots can use the intuitive graphical user interface (GUI) display to access global weather information including global Cloud Tops, Turbulence Nowcast and forecasts at 51 flight levels, weather radar, lightning, hail, EDR turbulence reports, contrail existence and persistence probabilities, as well as geographically located weather alerts. Turbulence and contrail forecasts are viewable in interface as a top-down plan view centered around the current aircraft location, as well as in vertical cross-section along the flight plan. This display can be manipulated by the pilot to show environmental hazards at all altitudes around the aircraft's projected route of flight. The system's architecture provides state-of-the-art cyber protection, resiliency and redundancy without compromising the ability to integrate, process and display numerous data types in real time The contrail computer system (CCS) can provide reliable, accurate, low-cost, high-resolution contrail forecasts, short-term contrail nowcasts and cutting-edge satellite observations. CCS fuses rapid update surface and aircraft-based observations, advanced weather radar products, ground-breaking satellite data assimilation techniques, and state-of-the-art NWP technologies and is capable of supporting operations anywhere in the world. Nowcasts are a unique combination of quality controlled near real-time observations blended with rapid-update forecast products. These nowcasts produce a highly detailed situational awareness assessment of current and short-term predicted conditions which are useful in remote regions where ground-based and in-situ measurements are sparse or nonexistent. CCS is able to directly synthesize and process global weather data through a secure hybrid cloud-based supercomputing solution to produce specifically tailored operational products CCS combines the capabilities of traditional lower spatial-resolution weather predictions with more advanced technologies including rapid-update high spatial and spectral resolution satellite observations and cloud-scale prediction technology. By fusing high spatial resolution satellite images with high spectral resolution sounders on multiple platforms, CCS combines data from multiple sensors in polar orbit with those in geostationary orbit, producing the high spatial, temporal and spectral resolution global coverage required for mission and intelligence support.

An exemplary software architecture implementation of a CCS, consistent with embodiments of the present disclosure, may be implemented by offering, among other things, functions that support data collection and integration from diverse data formats/organizations/hardware, storing of data, downloading of data from the system, analyzing and visualizing data available within the system, computing spatial functions relating to the data, enabling access to the data and data processing via an API supporting a variety of data protocols, storage for raw data in a compressed format, columnar storage for point measurements (e.g., in-situ measurements), array storage for gridded and/or multi-dimensional measurements, a combination of one or more databases and/or file systems for storing gridded data and satellite measurements, in-memory storage for responsive analytics, queries, means for working with private data streams, capacity for scientific visualization of data, multi-dimensional exploration of data using interfaces implementing 2D or more dimensional maps (an example of 4D map could be a physical sphere or any other shape with interface for visualizing, animating and working with a spatial environment changing in time), integration possibilities for 3rd party free or commercial applications, and/or the like.

Various systems and/or components of the CCS architecture may be associated with one or more conceptual layers, components, and/or platforms for performing certain functions of the systems and methods disclosed herein. The conceptual layers, components, and/or platforms may include, without limitation, a work layer, a dataflow layer, a storage layer, an analytics layer, data sources, APIs, and/or one or more computing platforms.

The Following References are Incorporated by Reference in their Entirety

Appleman, H., 1953: the formation of exhaust condensation trails by jet aircraft. *Bull. Amer. Meteor. Soc.,* 34, 14-20.

Busen, R. and U. Shumann, 1995: Visible contrail formation from fuels with different sulfur contents. *Geophys. Res. Lett.,* 22, 1357-1360.

Peters, J. L., 1993: New techniques for contrail forecasting. AWS/TR-93/001, 26 pp. [Available from HQ Air Weather Service, Scott Air Force Base, IL 62225]

Pilié, R. J. and J. E. Jiusto, 1958: A laboratory study of contrails. *J. Meteor.,* 15, 149-154.

Shrader, M. L., 1997: Notes and Correspondence: Calculations of aircraft contrail formation critical temperatures. *J. App. Met.,* 36, 1725-1729.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A computer-implemented method for predicting aircraft contrail existence and persistence, the method executed by one or more processors of a contrail computer system (CCS) coupled to a numerical weather prediction (NWP) data source, comprising:

receiving, from the NWP data source, multi-dimensional gridded atmospheric data comprising temperature, pressure, and relative humidity values across a plurality of altitude levels and geographic coordinates;

selecting an aircraft engine type for an aircraft and retrieving a corresponding contrail factor (CF) from a stored engine-specific database;

computing, via the one or more processors, a critical temperature (Tc) field over the multi-dimensional grid by applying a plurality of engine-dependent thermodynamic equations parameterized as continuous functions of pressure and relative humidity, wherein the thermodynamic equations include at least one non-linear relationship defining contrail formation thresholds as a function of both pressure and relative humidity across multiple altitude-dependent regimes;

generating, for each grid point and altitude level, a contrail formation probability and a contrail persistence probability based on comparison of the Tc field with the received atmospheric data, wherein the probabilities define a three-dimensional gridded probability field;

updating the three-dimensional gridded probability field in response to time-varying NWP data to produce a time-evolving contrail prediction model; and outputting, to a flight planning interface, the three-dimensional gridded probability field configured for modifying the aircraft flight path to reduce contrail formation.

2. The method of claim 1, wherein the aircraft engine type is selected from the group consisting of a non-bypass type, a low bypass type, and a high bypass type.

3. The method of claim 1, wherein computing a critical temperature (Tc) field further comprises;

calculating $Tc,_{100}$ for atmospheric pressures from 500 to 50 hPa at 50 hPa intervals for the aircraft engine type and corresponding contrail factor; and estimating $TC,_{RH}$ for relative humidity from 0 to 100% at 10% intervals.

4. The method of claim 1, wherein computing a critical temperature (Tc) field further comprises;

performing logistic regression to obtain third-order polynomial $TC,_{RH}$ curves for relative humidity values from 0 to 100% at 10% increments, and tabulating third-order estimates of the polynomial values for the $TC,_{RH}$ curves.

5. The method of claim 4, further comprising;

defining potential for the aircraft to generate contrails using flight parameters associated with altitude, geographic location, and engine type to relate a specific location of the aircraft to a contrail probability value.

6. The method of claim 5, further comprising performing contrail existence and persistence prediction for the aircraft in-flight.

7. The method of claim 5, further comprising;

performing contrail existence and persistence prediction for a flight path of the aircraft during a flight planning phase, and comparing contrail existence probability fields of the flight path with grid-adjacent probability fields and adjusting the flight path of the aircraft for contrail avoidance.

8. The method of claim 1, wherein the contrail computer system (CCS) is coupled to a convection allowing numerical weather prediction (NWP) model further comprising full global satellite monitoring in a super computing environment, and fully-redundant cloud-based operational services.

9. The method of claim 1, wherein the numerical weather prediction (NWP) model comprises a computational grid of less than or equal to 3-km×3-km.

10. A contrail prediction system comprising:

one or more processors; a memory storing instructions; and an interface to a numerical weather prediction (NWP) data source, wherein the instructions, when executed, cause the system to:

ingest multi-dimensional gridded atmospheric datasets including temperature, pressure, and relative humidity;

retrieve engine-specific contrail factor (CF) values from a structured database;

compute a grid-resolved critical temperature (Tc) field using engine-dependent thermodynamic equations varying continuously with atmospheric pressure and relative humidity; wherein the thermodynamic equations include at least one non-linear relationship defining contrail formation thresholds as a function of both pressure and relative humidity across multiple altitude-dependent regimes;

generate a three-dimensional contrail probability field across selectable altitude layers and dynamically update the probability field based on real-time or forecast weather data; and output the probability field to a flight path optimization module configured to display alternate aircraft flight paths.

11. The contrail prediction system of claim 10, wherein the aircraft engine type is selected from the group consisting of a non-bypass type, a low bypass type, and a high bypass type.

12. The contrail prediction system of claim 10, wherein computing a grid-resolved critical temperature (Tc) field further comprises;

calculating $Tc,_{100}$ for atmospheric pressures from 500 to 50 hPa at 50 hPa intervals for the aircraft engine type and corresponding contrail factor; and estimating $TC,_{RH}$ for relative humidity from 0 to 100% at 10% intervals.

13. The contrail prediction system of claim 10, wherein computing a grid-resolved critical temperature (Tc) field further comprises;

performing logistic regression to obtain third-order polynomial $TC,_{RH}$ curves for relative humidity values from 0 to 100% at 10% increments, and tabulating third-order estimates of the polynomial values for the $Tc,_{RH}$ curves.

14. The contrail prediction system of claim 13, further comprising;

defining potential of the aircraft to generate contrails using flight parameters associated with altitude, geographic location, and engine type to relate a specific location of the aircraft to a contrail probability value.

15. The contrail prediction system of claim 14, further comprising performing contrail existence and persistence prediction for the aircraft in-flight.

16. The contrail prediction system of claim 14, further comprising;

performing contrail existence and persistence prediction for a flight path of the aircraft during a flight planning phase, and comparing contrail existence probability fields of the flight path with grid-adjacent probability fields and adjusting the flight path of the aircraft for contrail avoidance.

17. The contrail prediction system of claim 10, wherein the system is coupled to a convection allowing numerical weather prediction (NWP) model further comprising full global satellite monitoring in a super computing environment, and fully-redundant cloud-based operational services.

18. The contrail prediction system of claim 10, wherein the numerical weather prediction (NWP) model comprises a computational grid of less than or equal to 3-km×3-km.

* * * * *